US00RE43307E

(19) United States
(12) Reissued Patent
Sliva

(10) Patent Number: US RE43,307 E
(45) Date of Reissued Patent: Apr. 10, 2012

(54) HAND-OFF TECHNIQUE FOR A WIRELESS NETWORK

(75) Inventor: Vladimir Petr Sliva, Naperville, IL (US)

(73) Assignee: Alcatel Lucent, Paris (FR)

(21) Appl. No.: 12/437,094

(22) Filed: May 7, 2009

Related U.S. Patent Documents

Reissue of:
(64) Patent No.: 7,215,960
Issued: May 8, 2007
Appl. No.: 11/026,587
Filed: Dec. 30, 2004

(51) Int. Cl.
*H04Q 7/20* (2006.01)

(52) U.S. Cl. ..... 455/436; 455/438; 455/439; 455/440; 455/422.1; 455/403; 370/331; 370/332; 370/310; 370/328; 370/329

(58) Field of Classification Search ..... 455/436–444, 455/422.1, 403, 567, 500, 517, 550.1, 560, 455/426.1, 426.2, 432.1–432.3, 434, 435.2, 455/435.3; 370/331, 332, 334, 328, 329
See application file for complete search history.

(56) References Cited

U.S. PATENT DOCUMENTS

| | | | | |
|---|---|---|---|---|
| 5,850,606 | A * | 12/1998 | Bedingfield et al. | 455/439 |
| 6,285,880 | B1 | 9/2001 | Gagnon et al. | |
| 2003/0224795 | A1* | 12/2003 | Wilhoite et al. | 455/445 |
| 2004/0198349 | A1 | 10/2004 | Chin | |

FOREIGN PATENT DOCUMENTS

| | | | |
|---|---|---|---|
| KR | 98061822 | * | 7/1998 |

OTHER PUBLICATIONS

"Cellular Radiotelecommunications Intersystem Operations;" 3rd Generation Partnership Project 2 N/S0005.0; Version 1; XP-002379415; pp. 1, 2-57 to 2-60; Jul. 1997.
"IS-41 for Mobility Management;" James I. Yu; IEEE; New York, NY; XP-000494916; pp. 158-162; Sep. 29, 1992.
European Search Report.

* cited by examiner

*Primary Examiner* — Keith Ferguson
(74) *Attorney, Agent, or Firm* — Fay Sharpe LLP

(57) ABSTRACT

A technique that relates to use of a known messaging sequence, e.g., ISANSWER messaging in the IS-41 protocol, in a heretofore unknown manner to improve hand-off procedures that may be established between a serving (anchor or intermediate) mobile switching center and a target (or border) mobile switching center is provided. Specifically, the ISANSWER message is selectively sent from the serving mobile switching center to the target mobile switching center during the hand-off process. The transmission of the ISANSWER message in this manner allows the target mobile switching center to terminate ring back to a caller when the mobile station answers the call after the handoff has been started, but while the mobile station is still within a cell area of the serving mobile switching center.

20 Claims, 6 Drawing Sheets

HAND-OFF TECHNIQUE FOR A WIRELESS NETWORK

Matter enclosed in heavy brackets [ ] appears in the original patent but forms no part of this reissue specification; matter printed in italics indicates the additions made by reissue.

BACKGROUND OF THE INVENTION

This invention relates to an improved hand-off technique for a wireless network. More particularly, the invention relates to use of a known messaging sequence, e.g., ISANSWER messaging in the IS-41 protocol, in a heretofore unknown manner to improve hand-off procedures that may be established between a serving (anchor or intermediate) Mobile Switching Center (MSC) and a target (or border) mobile switching center. That is, the ISANSWER message is selectively sent from the serving (anchor or intermediate) mobile switching center to the target (or border) mobile switching center during the hand-off process that may be induced during call termination to a mobile station. The transmission of the ISANSWER message in this manner allows the target (or border) mobile switching center to end ring back to a caller and to actually connect the call when the mobile station answers the call while it was still within a cell area of the serving (anchor or intermediate) mobile switching center.

While the invention is particularly directed to the art of hand-off techniques, and will be thus described with specific reference thereto, it will be appreciated that the invention may have usefulness in other fields and applications.

By way of background, a variety of hand-off techniques are well known in the wireless industry. Many of these hand-off techniques are governed by the American National Standards Institute Standard 41 (ANSI41 or IS-41).

To illustrate one type of hand-off technique, referring to FIG. 1, a network 10 includes a first mobile switching center 12 and a corresponding cell site 14. Also illustrated in FIG. 1 are a second mobile switching center 16 and a second cell site 18. It should be appreciated that the first mobile switching center 12 may also be referred to as the serving (anchor or intermediate) mobile switching center and the second mobile switching center 16 may also be referred to as the target (or border) mobile switching center. This nomenclature is useful because, as illustrated, a mobile device 20 migrates from an area of cell site 14 corresponding to the mobile switching center 12 to an area of cell site 18 corresponding to the mobile switching center 16. The anchor MSC is the first to assign a traffic channel. In the examples, a simple scenario of a hand-off from the serving MSC or anchor MSC is described. Nevertheless, note that the handoff, as well as the concept of using ISANSWER, may occur in other situations. For example, the handoff may also happen from an intermediary MSC (after handoff from anchor), still during a call termination. Also shown in FIG. 1 is another communication device 24 which, for purposes of this example, may take a variety of forms and is operative to establish a call between itself and the mobile device 20.

Using the example network of FIG. 1, a hand-off procedure embodied in a call flow 30 is illustrated in an example in FIG. 2. The call flow 30 begins with a hard hand-off request being transmitted from the cell site 14 to the serving (anchor or intermediate) mobile switching center 12 (at line 32). This occurs after a mobile device, such as the mobile device 20, migrates from an area corresponding to, for example, the cell site 14 (and the signal there becomes weak) to an area corresponding to, for example, the cell site 18.

The serving (anchor or intermediate) mobile switching center 12 then sends an invoke message, e.g., a Facility Directive (FACDIR2) message, to the target (or border) mobile switching center 16 (at line 34). It should be understood that the functionality of providing ring back to a caller that may be calling the mobile device may be (and in many actual systems is) provided from the target (or border) mobile switching center after this message is received by this target (or border) MSC. So, from this point forward, ring back is provided by the target (or border) mobile switching center, not the serving (anchor or intermediate) mobile switching center.

The rationale for this transfer of ring back responsibility to the target (or border) mobile switching center is based on the fact that, when the mobile device is answered on the target (or border) MSC, the system can simply perform normal switching functions through, for example, a Digital Cellular Switch (DCS). The ring back function can then simply be discontinued. This discontinuation of ring back is immediate. Otherwise, if the serving (anchor or intermediate) mobile switching center were providing the ring back, there would be a delay between the actual answer on the target (or border) and the receipt and processing of the ISANSWER invoke message (conventionally only sent from the target (or border) mobile switching center to the serving (anchor or intermediate) mobile switching center). This delay could result in overlap of "talking" phase of the call and giving the ring back to the caller.

Referring back to FIG. 2, the target (or border) mobile switching center 16 then sends a (FACDIR2) return result to the serving (anchor or intermediate) mobile switching center 12 (at line 36). The mobile switching center 12 consequently sends a message to the mobile device 20 through cell site 14 to start the handoff process, like, if applicable, to retune to an appropriate frequency so that the hand-off can be successfully completed (at line 38).

During a successful hand-off, the cell site 18 will ultimately send a hand-off confirmation message to the target (or border) mobile switching center 16 (at line 40). Then, the mobile switching center 16 completes the hand-off procedure by sending a mobile-on-channel message to the serving (anchor or intermediate) mobile switching center 12 (at line 42).

If the mobile device 20 is called by another communication device (such as the communication device 24 in FIG. 1) during hand-off, and the mobile device 20 is answered while in the area of cell site 18, then the cell site 18 sends an answer message to the target (or border) mobile switching center (at line 44). The target (or border) mobile switching center 16 then sends an ISANSWER invoke message to the serving (anchor or intermediate) mobile switching center (at line 46) to indicate that the call has been answered. Of course, the target (or border) mobile switching center 14 also ends the ring back to the caller at this point in time and connects the call by connecting the traffic channel from (the mobile and) the target cell to the inter-vendor trunk between target and serving MSCs.

The network as illustratively shown in FIG. 1 does not, however, address the situation where the mobile device 20 is answered after FACDIR2 invoke is sent while still in the area of the cell site 14 during the hand-off procedure. At present, if this situation occurs, the ring back will continue to be provided by the target (or border) mobile switching center 16 and the caller using communication device 24 will continue to receive a ring back, as opposed to being connected to the mobile device 20. This is, of course, not a desirable situation.

In particular, during the handoff process from the serving (anchor or intermediate) mobile switching center to the target (or border) mobile switching center, there is a "time window" of interest. This time window begins when the FACDIR2 invoke message is sent from the serving (anchor or intermediate) mobile switching center to the target (or border) mobile switching center. The time window ends when the mobile device actually re-tunes from the cell site associated with the serving (anchor or intermediate) mobile switching center to the cell site associated with the target (or border) mobile switching center. The time window is of a significant, non-zero, length. During this time window, two IS-41 messages are typically received at the serving (anchor or intermediate) mobile switching center from the target (or border) mobile switching center. In this scenario, however, there is no message sent from the serving (anchor or intermediate) mobile switching center to the target (or border) mobile switching center after the FACDIR2 invoke message. Therefore, there is no mechanism that is able to direct the target (or border) mobile switching center to stop the ring back (and switch the call), if the mobile device answers within the area of the serving (anchor or intermediate) mobile switching center (i.e., within the area of cell site 14) during the "time window" specified above. Thus, the target (or border) mobile switching center will keep ringing back towards the caller, even after the called mobile device answers. Plus, the appropriate switching action on the target (or border) MSC connecting the mobile to the trunk between the target (or border) and the serving (anchor or intermediate) MSCs may not happen. This is clearly unacceptable, as this would interfere with the conversation that could otherwise start at this point.

The present invention contemplates a new and improved hand-off technique for a wireless network that resolves the above-referenced difficulties and others.

SUMMARY OF THE INVENTION

A method and apparatus for improved hand-off procedures are provided.

In one aspect of the invention, the method comprises initiating a hand-off procedure for a mobile device migrating between a first mobile switching center and a second mobile switching center, determining that a communication device is attempting to terminate a call to the mobile device during the hand-off procedure (or thereafter), determining that the mobile device answers the call during the hand-off procedure, the mobile device being within a geographic area corresponding to the first mobile switching center and sending a message (like ISANSWER invoke) from the first mobile switching center to the second mobile switching center, the message indicating that the call was answered.

In another aspect of the invention, the initiating of the hand-off procedure includes providing the second mobile switching center with responsibility for providing ring back to the communication device.

In another aspect of the invention, the method further comprises receiving a return result in response to the (e.g., ISANSWER) invoke message.

In another aspect of the invention, the method further comprises completing the hand-off procedure.

In another aspect of the invention, the message comprises a facility directive (2) message.

In another aspect of the invention, the method further comprises receiving the message.

In another aspect of the invention, the method further comprises terminating ring back based on the message.

In another aspect of the invention, the methods are implemented using suitable means.

In another aspect of the invention, the system comprises a first MSC operative to initiate a hand-off procedure for a mobile device migrating out of a geographic area corresponding to the first MSC, determine that a communication device is attempting to establish a call with the mobile device during the hand-off procedure, determine that the mobile device answers the call during the hand-off procedure, even after the handoff attempt has already been indicated from the first MSC to the second MSC while the mobile device is still within the geographic area corresponding to the first MSC and transmit a message indicating that the call was answered and a second MSC operative to receive the message and end ring back (and switch the call, i.e., make sure to establish the connection between the mobile and the trunk from the second MSC to the first MSC) based on the message.

In another aspect of the invention, the first MSC is operative to provide the second MSC with responsibility for providing ring hack to the communication device.

In another aspect of the invention, the message comprises a facility directive (2) message.

In another aspect of the invention, the method and/or system may be applied to other hand-off procedures such as hand-back and "hand-off to third" situations.

Further scope of the applicability of the present invention will become apparent from the detailed description provided below. It should be understood, however, that the detailed description and specific examples, while indicating preferred embodiments of the invention, are given by way of illustration only, since various changes and modifications within the spirit and scope of the invention will become apparent to those skilled in the art.

DESCRIPTION OF THE DRAWINGS

The present invention exists in the construction, arrangement, and combination of the various parts of the device, and steps of the method, whereby the objects contemplated are attained as hereinafter more fully set forth, specifically pointed out in the claims, and illustrated in the accompanying drawings in which:

DETAILED DESCRIPTION OF THE PREFERRED EMBODIMENTS

Sending an ISANSWER invoke message from the serving (anchor or intermediate) mobile switching center to the target (or border) mobile switching center is not covered by the ANSI41 standard, particularly with respect to the contemplated use for call terminations to the mobile herein. In accordance with this invention, however, a well timed provision of the ISANSWER message to the target (or border) mobile switching center provides a resolution of the difficulty noted above relating to appropriate discontinuation of the ring back that the target (or border) mobile switching center will be giving to the caller, as well as relating to appropriate connecting of the call on the target (or mobile) MSC. Therefore, implementation of the presently described embodiments resolves the noted difficulties.

Figure 1:
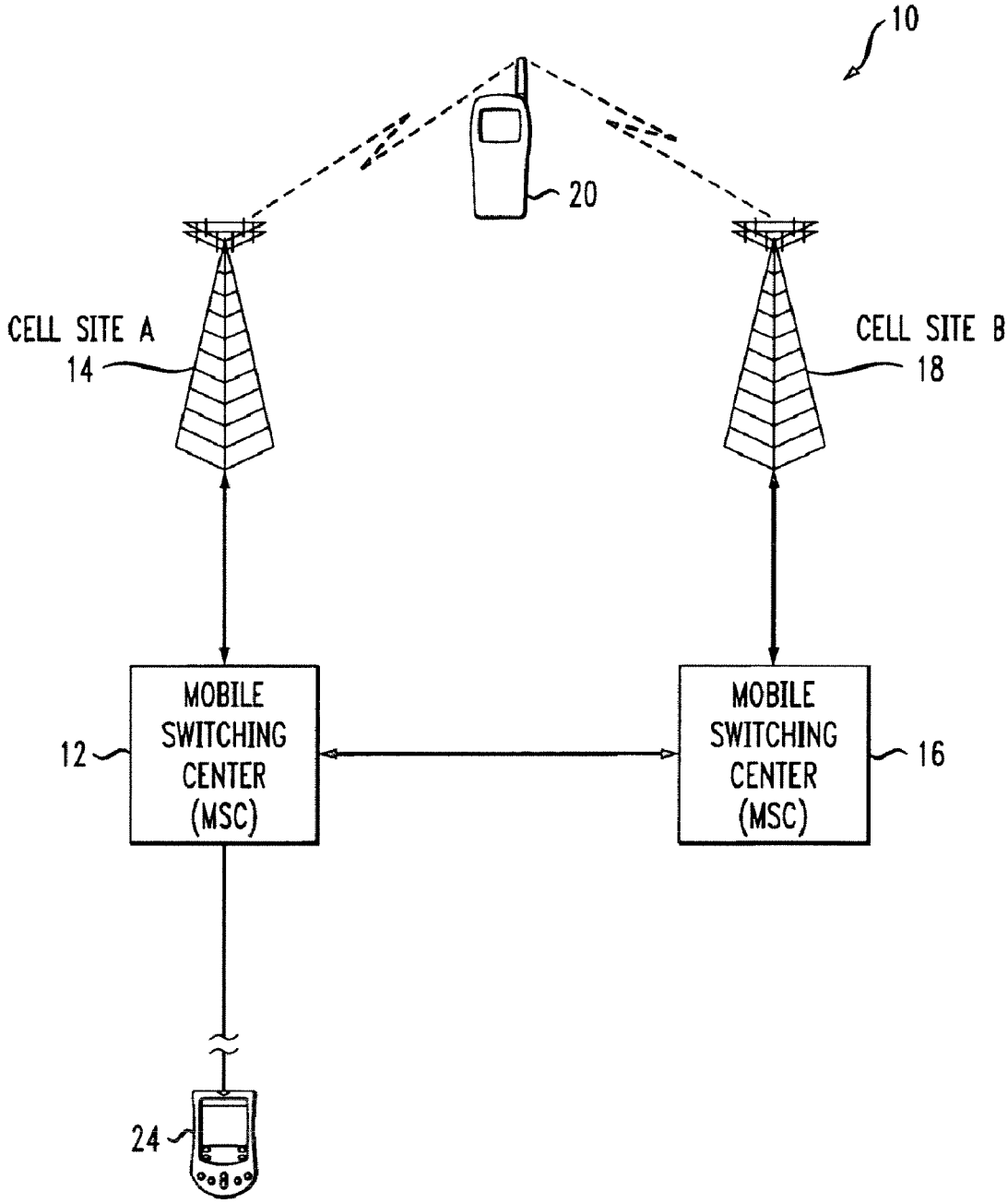
FIG. 1 is a block diagram illustrating an example network.
Figure 2:
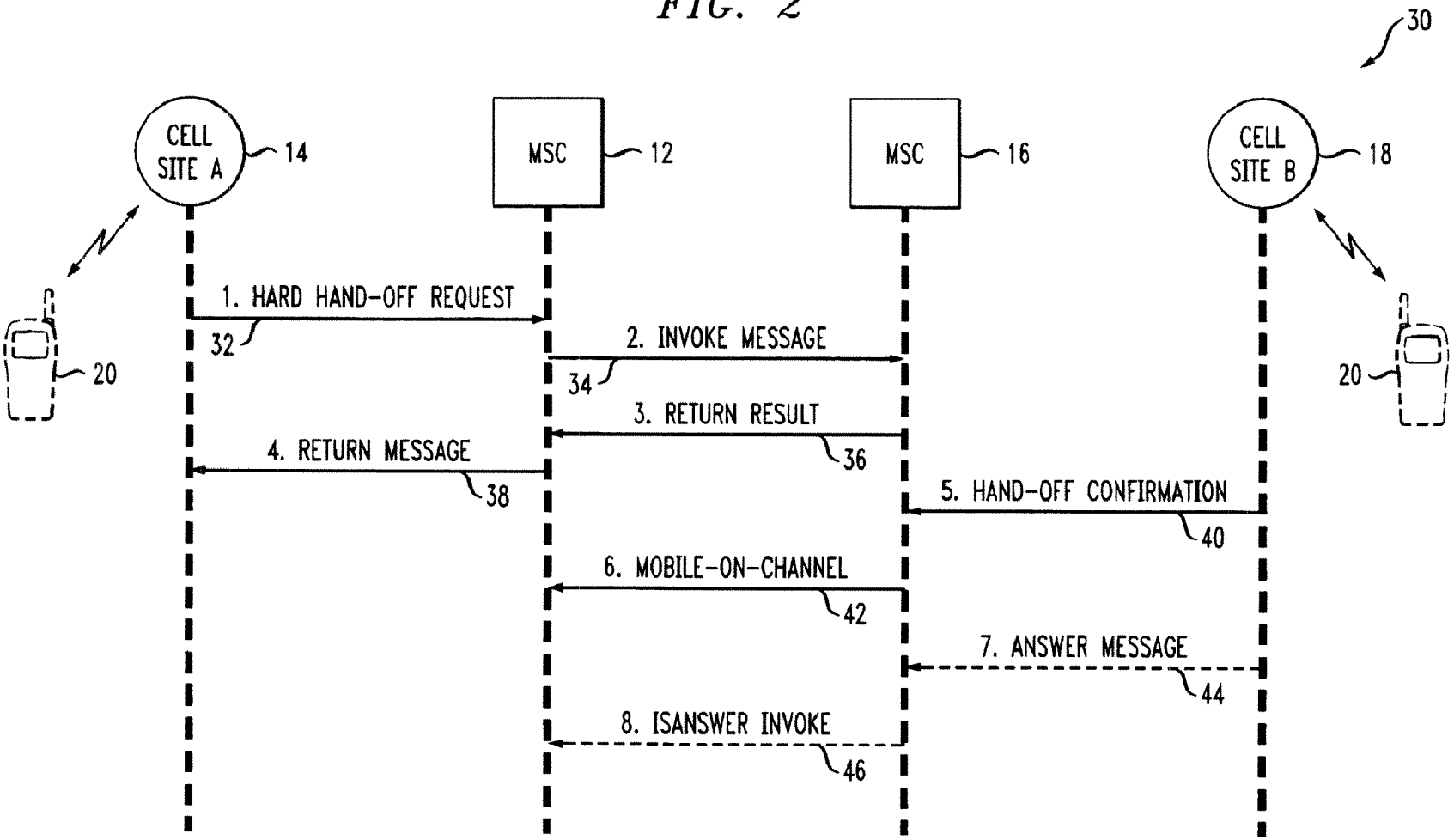
FIG. 2 is a call flow diagram illustrating a hand-off procedure based on the standards.
Figure 3:
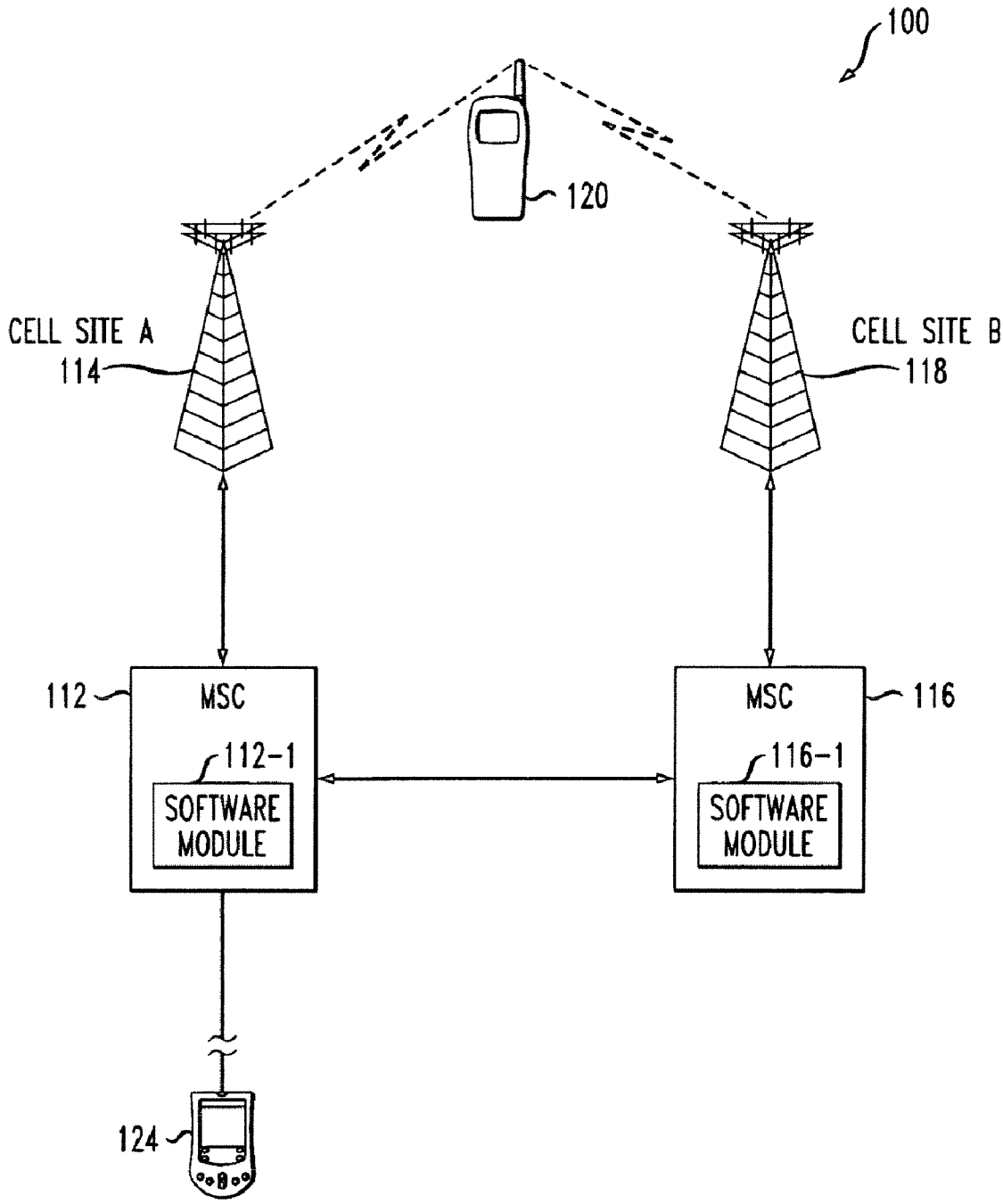
FIG. 3 illustrates a network into which the present invention may be implemented.

Referring now to the drawings wherein the showings are for purposes of illustrating the preferred embodiments of the invention only and not for purposes of limiting same, FIG. 3 provides a view of a network into which the present invention may be implemented. As shown, an exemplary network 100 is illustrated. The network includes a first, or serving (anchor or intermediate), mobile switching center 112 having a software module 112-1 for implementing and/or storing software routines to implement features of the present invention and other functionality. Also included in the network is a cell site 114 operative to communicate with a mobile device 120. The cell site 114 has a corresponding geographic area for which it provides service.

The network 100 includes a second, or target (or border), mobile switching center 116. The target (or border) mobile switching center 116 likewise includes a software module 116-1 for implementation and/or storage of software routines to carry out features of the present invention and other functionality. The mobile switching center 116 is operative to communicate with a cell site 118 that, once the hand-off procedures are complete, will be able to fully communicate with the mobile device 120. The cell site 118 has a corresponding geographic area for which it provides service. Also shown in the network is another communication device 124 that, in this scenario, is operative to terminate the call to and communicate with the mobile device 120.

As noted, the mobile switching centers provide software routines in, for example, the software modules 112-1 and 116-1, that will implement the present invention. The software routines may be included within conventional call processing software that is stored within the mobile switching center or any other software that performs suitable functions according to applicable standards such as IS-41. It will be understood by those of skill in the art that the software routines may be implemented in a variety of manners and may invoke the use of a variety of hardware configurations to carry out functionality of the wireless network, including functionality described in connection with the present invention.

It should also be understood that the mobile switching centers may take a variety of forms and typically will include appropriate hardware and software routines to perform other functionality that is not described herein, for ease of explanation. The present invention is particularly applicable to the situation where the serving (anchor or intermediate) mobile switching center is manufactured by a different vendor than the target (or border) mobile switching center.

Those of skill in the art will also understand that any primary switching module in a wireless network may be used as an alternative to the mobile switching centers. For example, other such switching modules may be implemented in other generations of wireless technology.

The cell sites 114 and 118 may also take a variety of forms that are known in the field. Again, the exact form thereof may be a function of the generation of technology that is implemented. Likewise, the communication device 124 may take numerous forms including a landline phone, a wireless phone, a personal digital assistant, personal computer, . . . etc. As shown, the mobile device 120 may take a variety of wireless forms including that of a wireless phone, a personal digital assistant, a personal computer with wireless communication capability, . . . etc.

As alluded to above, the invention relates to use of a known messaging sequence, e.g., ISANSWER messaging in the IS-41 protocol, in a heretofore unknown manner to improve hand-off procedures that may be established between the serving (anchor or intermediate) mobile switching center 112 and the target (or border) mobile switching center 116. That is, the ISANSWER message is selectively sent from the serving (anchor or intermediate) mobile switching center 112 to the target (or border) mobile switching center 116 during the hand-off process and a termination to the mobile. The transmission of the ISANSWER message in this manner allows the target (or border) mobile switching center 116 to end ring back to a caller when the mobile station 120 answers the call while it is still within a cell area of the serving (anchor or intermediate) mobile switching center, e.g., the area corresponding to the cell site 114.

Figure 4:
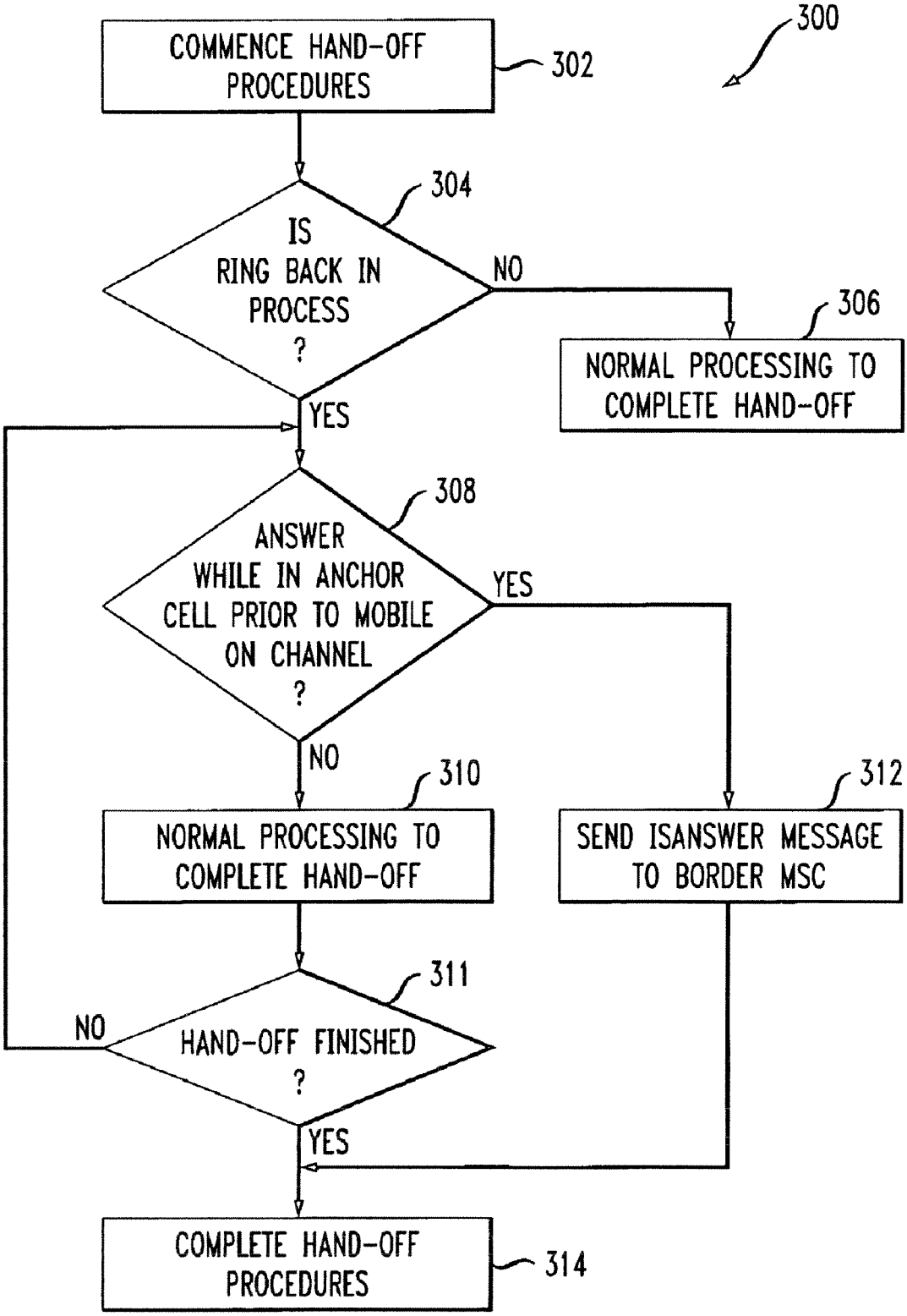
FIG. 4 illustrates a flow chart illustrating a method according to the present invention.

From the perspective of the serving (anchor or intermediate) (or intermediate; in general, serving MSC) mobile switching center, such as the mobile switching center 112, a method of the present invention is described in connection with FIG. 4. This method may be embodied in the software module 112-1, as noted above. As shown, a method 300 is initiated upon commencement of hand-off procedures (at 302). The initiation of these procedures may include the provision of a facility directive invoke message (e.g., FACDIR2) from the serving (anchor or intermediate) mobile switching center 112 to, for example, a target (or border) mobile switching center 116. This facility directive message will typically provide data needed by the target (or border) mobile switching center 116 to perform the handoff. Also, in some actual widely used implementations, the data the facility directive invoke contains will imply (for the call which is being terminated to the mobile device 120 and which is also, at the same time, being handed off) that the target (or border) MSC should take responsibility for ring back functions. Therefore, the target (or border) mobile switching center 116 will provide ring back to any device, such as communication device 124, attempting to communicate with (specifically, terminate the call to) the mobile device 120 during a hand-off procedure.

The method of the present invention checks whether a ring back is actually in progress (at 304). If no ring back is in progress, normal processing to complete the hand-off is accomplished (at 306).

If it is determined that a ring back is in progress, then the serving MSC not only expects and processes the (FACDIR2) Return Result and Mobile on Channel IS-41 messages, but also needs to monitor whether the mobile device 120 answered the call while still within the area of the serving (anchor or intermediate) mobile switching center 112, or the area corresponding to the cell site 114, prior to (or close to) the mobile-on-channel message being received (at 308). If not, normal processing to complete the hand-off is completed (at 310). A check is then made as to whether hand-off is finished (at 311). If so, the hand-off procedures are completed (at 314) as is known. If not, the process returns to 308.

If, however, the mobile device 120 answers the call while still within the area of the cell site 114 and prior or close to receipt of the mobile-on-channel message, then the mobile switching center 112 sends an ISANSWER message invoke to the target (or border) mobile switching center 116 (at 312). If the transaction is successful, the mobile switching center 112 then receives the return result for the ISANSWER invoke (ISANSWER RR) from the target (or border) mobile switching center 116 and the hand-off procedures are then completed (at 314).

Figure 5:
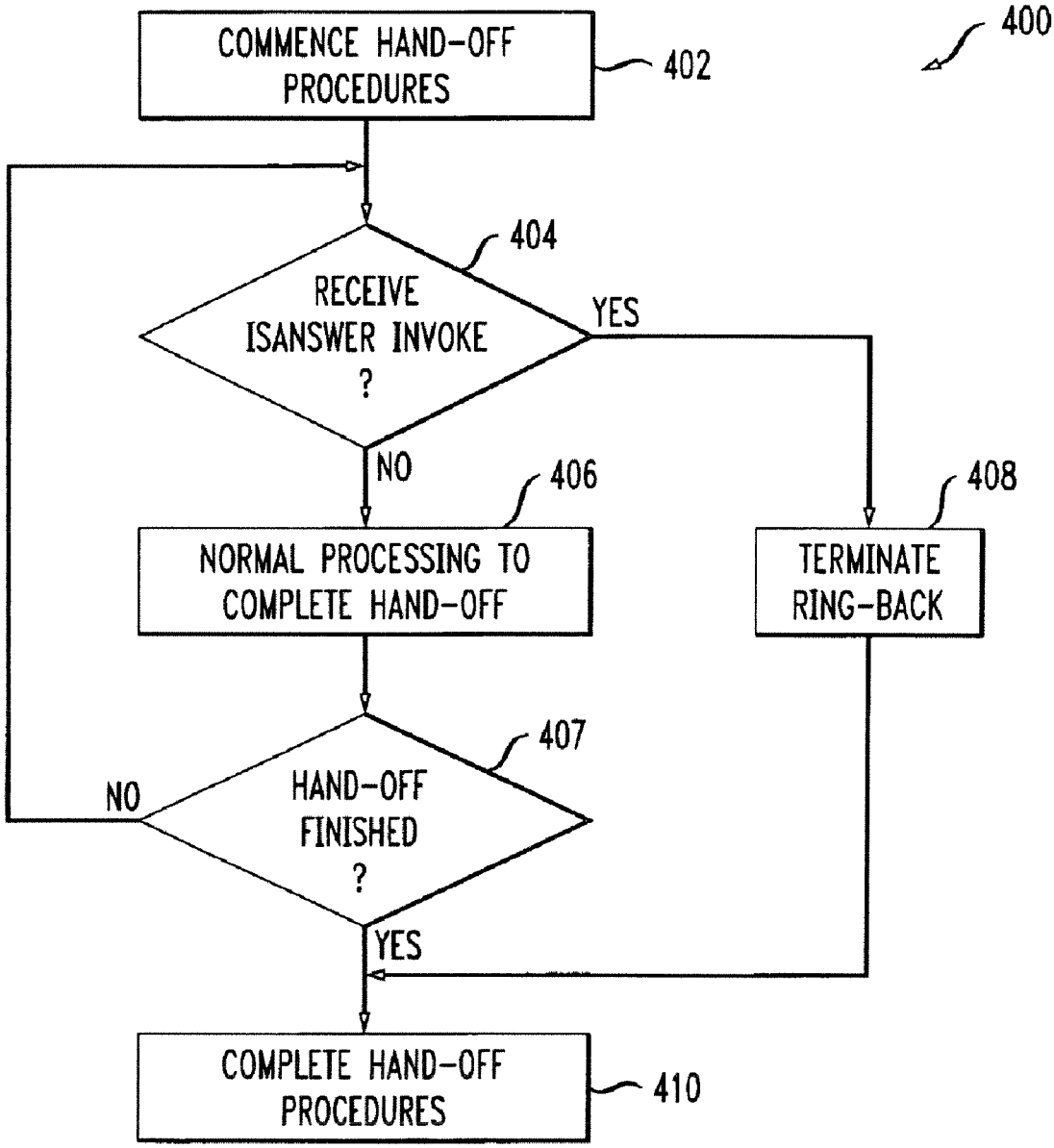
FIG. 5 is a flow chart illustrating a method according to the present invention; and, FIG. 6 is a call flow diagram illustrating the present invention.

Implementation of this process will allow the target (or border) mobile switching center 116 to appropriately terminate the ring back to the caller, e.g., the caller using communication device 124, to allow for (full) communication between the caller and the called party. In this regard, from the perspective of the target (or border) mobile switching center 116, FIG. 5 illustrates an example procedure. This procedure or method may be embodied in the software module 116-1, as noted above.

As shown, the method 400 includes the commencement of hand-off procedures (at 402) which may, as noted above, include the receipt of the ring back functionality that is necessary to provide to calling parties to indicate an attempt to connect to a mobile device, such as mobile device 120 (i.e., terminate the call to mobile device 120). Implementation of ring back may be realized in any number of known manners. This method allows for the determination of whether an ISANSWER invoke message is received by the target (or border) mobile switching center 116 from the serving (anchor or intermediate) mobile switching center 112 during the ring back process (at 404). If no such ISANSWER invoke message is received, normal processing to complete the hand-off is conducted (at 406 and then, eventually, 410). As shown, a check is made to determine if hand-off is finished (at 407). If so, the procedures are completed (at 410). If not, the process returns to 404. This, of course, provides monitoring as to whether the ISANSWER message is received. If an ISANSWER invoke message is eventually received by the target (or border) mobile switching center 116, the target (or border) mobile switching center 116 ends the ring back to the calling party (i.e., to communication device 124) (at 408). Ending the ring back to the calling party may be accomplished using a variety of known techniques. Thus, also, appropriate communication can then be established between the communication device 124 and the mobile device 120. The hand-off procedures are also completed (at 410).

It is to be appreciated that the methods described herein may be implemented in a variety of manners and in a variety of different networks. In addition, a variety of different call flows may result depending on the precise circumstances of the hand-off. For example, the call flows may depend on whether the mobile device 120 is in the process of being contacted by another communication device during the hand-off procedure. Moreover, the time at which the mobile device answers an attempted call may be factor in the sequence of the call flow.

Figure 6:
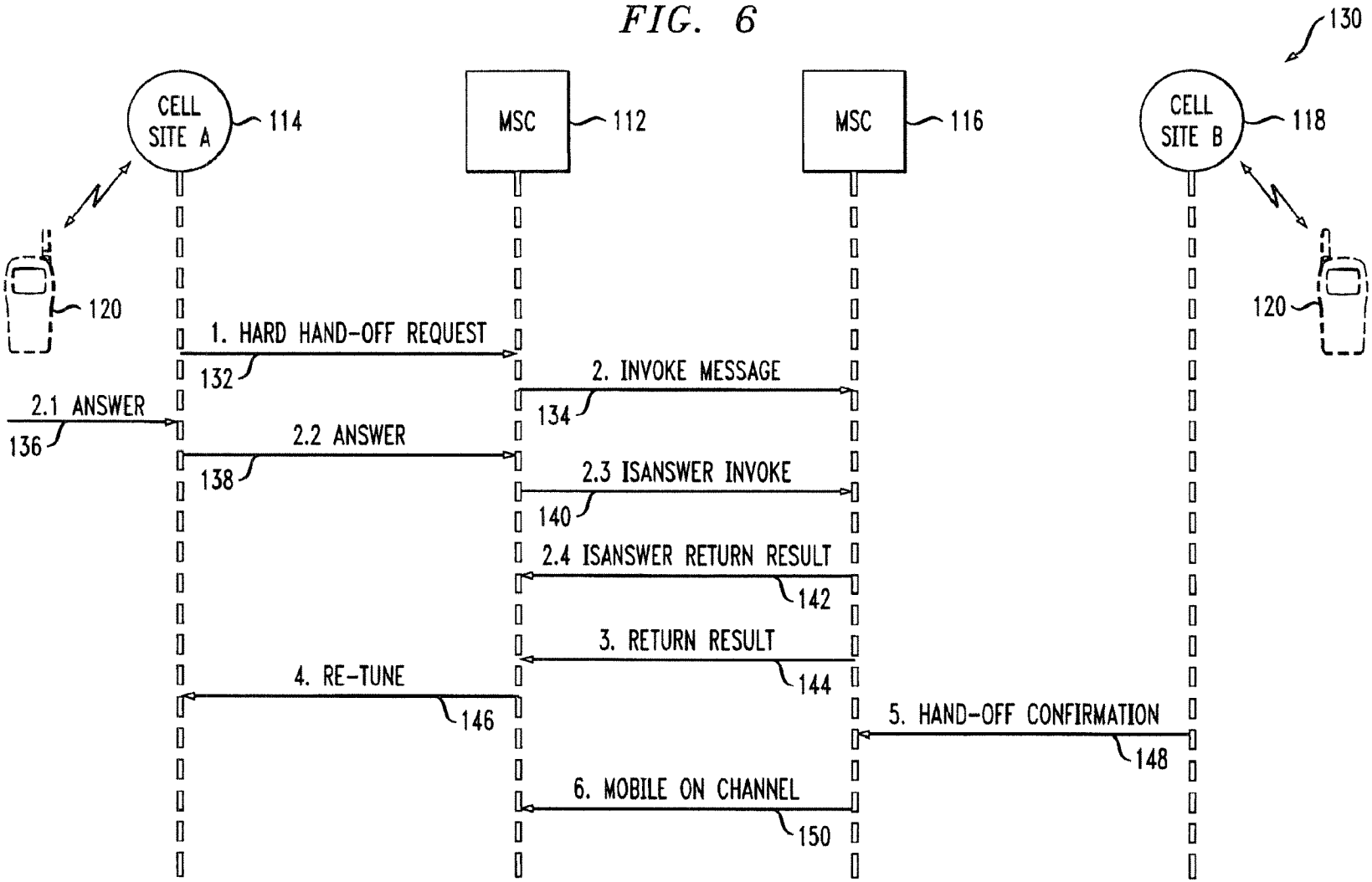

However, to illustrate the embodiments of the present invention, call flow 130 of FIG. 6 is provided. With reference thereto, a hard hand-off request is transmitted from the cell site 114 to the mobile switching center 112 (at line 132). The mobile switching center 112 then transmits a facility directive (FACDIR2) invoke message to the mobile switching center 116 (at line 134). As noted above, it should be appreciated that this invoke message will typically include the data to indicate to the target (or border) mobile switching center 116 to take over ring back responsibility for the terminating call. Implementation of ring hack may be realized in any number of known manners.

It will be understood that the present invention is particularly useful where the mobile device 120 is answered after FACDIR2 invoke but during the hand-off procedures while still within an area associated with the serving (anchor or intermediate) mobile switching center 112. In this case, as shown in the call flow 130, the mobile device 120 is answered and sends a message to the cell site 114 (at line 136). Consequently, the cell site 114 sends an answer message to the serving (anchor or intermediate) mobile switching center 112 (at line 138). The mobile switching center 112 then sends an ISANSWER invoke message to the target (or border) mobile switching center 116 (at line 140). It should be appreciated that the target (or border) mobile switching center 116 then ends the ring back so that the party calling the mobile device 120 does not continue to hear ring back and the call is connected or switched on the target (or border) MSC after the mobile device 120 has actually been answered. Ending of the ring back to the calling party may be accomplished using a variety of known techniques. The mobile switching center 116 then sends an ISANSWER return result to the serving (anchor or intermediate) mobile switching center 112 (at 142).

At some point, a return result is sent from the target (or border) mobile switching center to the serving (anchor or intermediate) mobile switching center with respect to the facility directive, or invoke message (at line 144). It will be understood that the procedures of the present invention, i.e., transmission of the ISANSWER invoke message from the serving (anchor or intermediate) mobile switching center 112 to the target (or border) mobile switching center 116, may be implemented or may be induced to happen at any point after the facility directive invoke message is sent from the mobile switching center 112 to the mobile switching center 116. So, although the portions of the call flow relating to this feature (e.g., lines 136, 138, 140 and 142) are shown as occurring between the lines 134 and lines 144, these functions may also be performed, e.g., after the (FACDIR2) return result, such as that shown at line 144, is transmitted.

Normal procedures for hand-off are then conducted and may take a variety of forms. In the example shown, a "retuning" message is sent from the serving mobile switching center 112 to the cell site 114 (at line 146). Ultimately, the cell site 118 confirms the hand-off procedures (at line 148). Last, the mobile-on-channel message is sent from the target (or border) mobile switching center 116 to the serving mobile switching center 112 (at line 150).

It should be appreciated that the invention has been described in terms that generally apply to forward hand-off procedures. However, it will be understood that the invention may also be applied to other hand-off procedures, such as, but not limited to, hand-back situations and "hand-off to third" scenarios. Those of skill in the art will recognize any changes to, for example, the messaging scheme to implement the invention in such environments.

The above description merely provides a disclosure of particular embodiments of the invention and is not intended for the purposes of limiting the same thereto. As such, the invention is not limited to only the above-described embodiments. Rather, it is recognized that one skilled in the art could conceive alternative embodiments that fall within the scope of the invention.

I claim:

1. A method comprising:

initiating a hand-off procedure for a mobile device migrating between a first mobile switching center and a second mobile switching center;

determining that the hand-off procedure is being attempted during the initiation of a call to the mobile device from an associated communication device;

determining that the mobile device answers the call during the hand-off procedure, the mobile device still being within a geographic area corresponding to the first mobile switching center; and, transmitting a message from the first mobile switching center to the second mobile switching center, the message indicating that the call was answered.

2. The method as set forth in claim 1 wherein the initiating of the hand-off procedure includes providing the second mobile switching center with responsibility for providing ring back to the communication device.

3. The method as set forth in claim 1 further comprising receiving a return result in response to the transmitting.

4. The method as set forth in claim 1 further comprising completing the hand-off procedure.

5. The method as set forth in claim 1 wherein the message comprises an [facility directive] *ISANSWER invoke* message.

6. The method as set forth in claim 1 further comprising receiving the message.

7. The method as set forth in claim 6 further comprising terminating ring back based on the message.

8. The method as set forth in claim 1 wherein the hand-off procedure comprises hand-back procedures or hand-off to third procedures.

9. A system comprising:

means for initiating a hand-off procedure for a mobile device migrating between a first mobile switching center and a second mobile switching center;

means for determining that a communication device is attempting to establish a call with the mobile device during the hand-off procedure;

means for determining that the mobile device answers the call during the hand-off procedure, the mobile device being within a geographic area corresponding to the first mobile switching center; and, means for transmitting a message from the first mobile switching center to the second mobile switching center, the message indicating that the call was answered.

10. The system as set forth in claim 9 wherein the means for initiating the hand-off procedure includes means for providing the second mobile switching center with responsibility for providing ring back to the communication device.

11. The system as set forth in claim 9 further comprising means for receiving a return result in response to the transmitting.

12. The system as set forth in claim 9 further comprising means for completing the hand-off procedure.

13. The system as set forth in claim 9 wherein the message comprises a [facility directive] *ISANSWER invoke* message.

14. The system as set forth in claim 9 further comprising means for receiving the message.

15. The method as set forth in claim 14 further comprising means for ending ring back based on the message.

16. The system as set forth in claim 9 wherein the hand-off procedure comprises hand-back procedures or hand-off to third procedures.

17. A system comprising:

a first MSC operative to initiate a hand-off procedure for a mobile device migrating out of a geographic area corresponding to the first MSC, determine that a communication device is attempting to establish a call with the mobile device during the hand-off procedure, determine that the mobile device answers the call during the hand-off procedure while the mobile device is within the geographic area corresponding to the first MSC and transmit a message indicating that the call was answered; and, a second MSC operative to receive the message and end ring back based on the message.

18. The system as set forth in claim 17 wherein the first MSC is operative to provide the second MSC with responsibility for providing ring back to the communication device.

19. The system as set forth in claim 17 wherein the message comprises a facility directive message.

20. The system as set forth in claim 17 wherein the hand-off procedure comprises hand-back procedures or hand-off to third procedures.

* * * * *